(12) United States Patent
Bowsher

(10) Patent No.: US 9,194,604 B2
(45) Date of Patent: Nov. 24, 2015

(54) BURNER FOR GAS-FIRED AIR HEATER

(71) Applicant: The GSI Group, LLC, Assumption, IL (US)

(72) Inventor: Neil Bowsher, Sullivan, IL (US)

(73) Assignee: The GSI Group, LLC, Assumption, IL (US)

(*) Notice: Subject to any disclaimer, the term of this patent is extended or adjusted under 35 U.S.C. 154(b) by 279 days.

(21) Appl. No.: 13/790,956

(22) Filed: Mar. 8, 2013

(65) Prior Publication Data

US 2013/0233293 A1 Sep. 12, 2013

Related U.S. Application Data

(60) Provisional application No. 61/608,938, filed on Mar. 9, 2012.

(51) Int. Cl.
| | |
|---|---|
| *F24H 3/04* | (2006.01) |
| *F24H 9/00* | (2006.01) |
| *F26B 9/06* | (2006.01) |
| *F26B 23/02* | (2006.01) |
| *F26B 25/08* | (2006.01) |

(52) U.S. Cl.
CPC ............ *F24H 3/0488* (2013.01); *F24H 9/0068* (2013.01); *F26B 9/063* (2013.01); *F26B 23/02* (2013.01); *F26B 25/08* (2013.01); *Y02B 30/28* (2013.01)

(58) Field of Classification Search
CPC ..... F24H 3/0488; F24H 9/0068; F26B 25/08; F26B 9/063; F26B 23/02; Y02B 30/28; F23D 14/84; F23D 14/70
See application file for complete search history.

(56) References Cited

U.S. PATENT DOCUMENTS

| | | | |
|---|---|---|---|
| 6,550 | A | 6/1849 | Patten |
| 1,441,008 | A | 1/1923 | Lovett |
| 1,989,164 | A | 1/1935 | Beckwith |
| 2,250,304 | A | 7/1941 | Keating et al. |
| 2,754,895 | A | 7/1956 | Hershey |
| 3,280,473 | A | 10/1966 | Sullivan |
| 3,802,414 | A | 4/1974 | Lee |
| 3,881,863 | A | 5/1975 | Creuz |
| 4,790,744 | A | 12/1988 | Bellet et al. |
| 4,887,363 | A | 12/1989 | Burke |
| 5,375,995 | A | 12/1994 | Döbbeling et al. |
| 5,400,525 | A | 3/1995 | Sheley |
| 7,273,366 | B1 | 9/2007 | Sujata |

FOREIGN PATENT DOCUMENTS

| | | |
|---|---|---|
| EP | 0884528 A2 | 12/1998 |
| GB | 1165169 | 9/1969 |

OTHER PUBLICATIONS

Preliminary Report on Patentability from corresponding International Application No. PCT/US2013/029869 mailed Sep. 18, 2014.

*Primary Examiner* — Alfred Basichas

(57) ABSTRACT

A burner assembly for a grain bin for heating air moving through the assembly to dry grain in the bin. The burner assembly has a collector adapted to receive fuel from a fuel line. A burner housing attaches to the collector receives fuel from the fuel line. A nozzle is secured to the burner. A flame diverter downstream from the burner housing diverts the flame outwardly from the burner nozzle toward the housing wall. A flame cone having a slope generally similar to the slope of the diverter is positioned near the burner to define a gap between the inside face of the diverter and the outer surface of the flame cone so as to provide a path for the burning fuel to travel from the burner outwardly toward the housing walls for a more complete combustion of the fuel.

14 Claims, 12 Drawing Sheets

Temperature Rise

|      | 3 psi | 6 psi | 9 psi |
|------|-------|-------|-------|
| 37   | 121   | 174   | 222   |
| 37-2 | 122   | 176   | 217   |
| 37-3 | 119   | 176   | 216   |
| Ave: | 121   | 175   | 218   |

CO Emmissions

|      | 3 psi | 6 psi | 9 psi |
|------|-------|-------|-------|
| 37   | 16    | 31    | 31    |
| 37-2 | 19    | 31    | 31    |
| 37-3 | 16    | 31    | 31    |
| Ave: | 17    | 31    | 31    |

Flame Current

|      | 3 psi   |       | 6 psi   |       | 9 psi   |       |
|------|---------|-------|---------|-------|---------|-------|
|      | Std Dev | Ave   | Std Dev | Ave   | Std Dev | Ave   |
| 37   | 0.172   | 4.23  | 0.187   | 3.3   | 0.248   | 4.07  |
| 37-2 | 0.174   | 4.11  | 0.237   | 3.557 | 0.271   | 3.62  |
| 37-3 | 0.202   | 3.62  | 0.251   | 3.82  | 0.248   | 3.488 |
| Ave: | 0.183   | 3.987 | 0.225   | 3.559 | 0.256   | 3.726 |

Current Burner Test LP

Run burner at pressure for 5 min prior to taking readings

| Test: | 31A | 31B | 31C |
|---|---|---|---|
| Burner Design: | Current | Current | Current |
| Cup Design: | Current | Current | Current |
| Cone Design: | Current | Current | Current |
| Air Scoop. | No | No | No |
| Design 2 Diverter | Yes | Yes | Yes |
| Pipe Extensions: | No | No | No |
| LP Pressure: | 3 psi | 6 psi | 9 psi |
| C Stack Temp: | | | |
| Ambient: | 74 | 74 | 74 |
| Temperature Rise: | | | |
| M Meter Stack Temp: | 184 | 226 | 255 |
| M Meter Temp Rise | 110 | 152 | 181 |
| T Meter Stack Temp: | 183 | 223 | 255 |
| T Meter Temp Rise: | 109 | 149 | 181 |
| Ave Rise: | 109.5 | 150.5 | 181 |
| CO Content: | 46 | 73 | 86 |
| NO Content: | 1 | 1 | 1 |
| Nox Content: | 1 | 1 | 1 |
| Flame Current Ave: | 3.787 | 3.718 | 3.962 |
| Flame Current Std Dev | 0.166 | 0.111 | 0.093 |
| Static Pressure | 2.5 | | |

Run burner at pressure for 5 min prior to taking readings

| Test: | 37A | 37B | 37C |
|---:|:---:|:---:|:---:|
| Burner Design: | NB1-No holes | NB1-No holes | NB1-No holes |
| Cup Design: | 36 of 11/32TR | 36 of 11/32TR | 36 of 11/32TR |
| Cone Design: | Current | Current | Current |
| Air Scoop: | Yes | Yes | Yes |
| Design 2 Diverter: | Yes | Yes | Yes |
| Pipe Extensions: | 3/8x3-1/2 | 3/8x3-1/2 | 3/8x3-1/2 |
| LP Pressure: | 3 psi | 6 psi | 9 psi |
| C Stack Temp: | | | |
| Ambient: | 68 | 68 | 68 |
| Temperature Rise: | | | |
| M Meter Stack Temp: | 189 | 242 | 289 |
| M Meter Temp Rise: | 121 | 174 | 221 |
| T Meter Stack Temp: | 189 | 242 | 290 |
| T Meter Temp Rise: | 121 | 174 | 222 |
| Ave Rise: | 121 | 174 | 221.5 |
| CO Content: | 31 | 31 | 31 |
| NO Content: | 0 | 0 | 0 |
| Nox Content: | 0 | 0 | 0 |
| Flame Current Std. Dev : | 0.172 | 0.187 | 0.268 |
| Flame Current Ave: | 4.23 | 3.3 | 4.07 |
| Static Pressure: | 2.4 | | |

Fig. 17

Run burner at pressure for 5 min prior to taking readings

| Test: | 37-2A | 37-2B | 37-2C |
|---|---|---|---|
| Burner Design: | NB1-No holes | NB1-No holes | NB1-No holes |
| Cup Design: | 36 of 11/32TR | 36 of 11/32TR | 36 of 11/32TR |
| Cone Design: | Current | Current | Current |
| Air Scoop: | Yes | Yes | Yes |
| Design 2 Diverter: | Yes | Yes | Yes |
| Pipe Extensions: | 3/8x3-1/2 | 3/8x3-1/2 | 3/8x3-1/2 |
| LP Pressure: | 3 psi | 6 psi | 9 psi |
| C Stack Temp: | | | |
| Ambient: | 70 | 70 | 70 |
| Temperature Rise: | | | |
| M Meter Stack Temp: | 192 | 245 | 287 |
| M Meter Temp Rise: | 122 | 175 | 217 |
| T Meter Stack Temp: | 192 | 247 | 287 |
| T Meter Temp Rise: | 122 | 177 | 217 |
| Ave Rise: | 122 | 176 | 217 |
| CO Content: | 19 | 31 | 31 |
| NO Content: | 0 | 0 | 0 |
| Nox Content: | 0 | 0 | 0 |
| Flame Current Std. Dev.: | 0.174 | 0.237 | 0.271 |
| Flame Current Ave: | 4.11 | 3.557 | 3.62 |
| Static Pressure: | 2.4 | | |

Fig. 18

BURNER FOR GAS-FIRED AIR HEATER

CROSS-REFERENCE TO RELATED APPLICATIONS

This Non-Provisional application claims priority to U.S. Provisional Application Ser. No. 61/608,938 filed Mar. 9, 2012, and which is incorporated herein by reference.

STATEMENT REGARDING FEDERALLY SPONSORED RESEARCH

Not Applicable.

BACKGROUND

A heater for a grain bin, grain dryer, or the like in which air is heated by a gas fired burner and then inducted into a grain bin, grain dryer, or other structure for drying or otherwise conditioning grain therein. Conventionally as shown in FIGS. 1-5, such heaters include an outer housing 130 which may be connected to a grain bin 10 for directing heated air therefrom into the grain bin 10. A fan 34 forcefully moves air through the outer housing 130, past a burner 144 therein, and directs the heated air into the grain bin 10. Oftentimes, the grain bin 10 has a perforated floor 18 raised above a concrete pad 12 with the space between the floor 18 and the concrete pad 12 constituting a plenum 22. The heater 24 directs heated air under pressure into this plenum 22 where it is substantially uniformly distributed under the entire cross section of the grain bin 10 such that the heated air may pass upwardly through the floor 18 and through the grain supported on the floor 18 so as to dry the grain.

Typically, most grain bin dryers are gas fired dryers which burn either liquefied petroleum (e.g., liquid propane) or natural gas, such as the grain bin dryer of U.S. Pat. No. 5,400,525 which is incorporated by reference herein. The dryer fan may be either an axially blower located upstream from the heater and generally in axial alignment with the heater, or the fan may be a centrifugal fan (not illustrated) coupled to the heater upstream from the heater. Such heaters 24 typically include a gas burner 144 positioned within the central portion of the heater outer housing 130 so that when the gas fuel is ignited, a flame is generated which heats the air forced by the fan through the heater outer housing 130 and into the grain bin 10. It has been long known that by providing such gas fired grain bin heaters 10 with a flame diverter 170 that the flame can be more uniformly distributed within the outer housing 130 thus resulting in better heating of the air being forced through the heater 24. Typically, such prior art flame diverters comprise a plurality of spaced slats 182 arranged in a generally conical configuration with the apex of the conical flame diverter 170 being positioned close to the burner 144 at the center of the heater outer housing 130 so as to direct the flame outwardly toward the walls of the outer housing 130. Typically, these flame diverter slats 182 are provided with a multiplicity of holes 183 therein so as to aid in supplying air to the air/fuel mixture.

In a gas burner, the gas fuel has a certain calorific value typically expressed in BTU/cubic foot of the gas fuel. For example, natural gas may have a calorific value of about 1,000 BTU/cu. ft., and commercially available propane (L.P.) gas may have a calorific value of about 2,350 BTU/cu. ft. If these gaseous fuels are completely combusted, the products of combustion will include carbon dioxide, water, and nitrogen compounds from the combustion air. Of course, complete combustion insures the maximum release of heat from the fuel and results in the most efficient operation of the burner. Complete combustion of the fuel results in the maximum amount of air being heated. Usually, complete combustion of the fuel is visually evidenced by the flame burning with a bluish or colorless flame. If combustion is incomplete, as will be the case if there is not sufficient air for complete combustion, carbon monoxide and carbon will also make up part of the combustion products. It is well recognized that the presence of a "yellowish" flame is a sign that incomplete combustion (and thus less efficient combustion) is occurring such that the maximum efficiency of the burner is not being realized.

In many prior art grain dryer heaters such as above-described, it has long been noted that at least certain portions of the flame within the burner had a generally yellowish appearance which is an indication of incomplete combustion. Typically, such areas of incomplete combustion were immediately downstream from the burner nozzle located at the center of the grain bin heater housing. However, with the known prior art burners it has not heretofore been possible to regulate the position of the flame within the heater housing so as to achieve both complete combustion and to divert the flame outwardly toward the walls of the housing so as to result in a more evenly distributed heating of the air. The above-described flame diverters with their spaced slats did effectively direct the flames outwardly from the burner toward the walls of the housing, but such flame diverters (even when their spaced slats were provided with a multiplicity of holes therein) were not effective so as to insure that substantially complete combustion of the gaseous fuel would result even if the burner was regulated to admit more air into the burner for mixing with the fuel prior to the point the fuel was ignited. As above-noted, in conventional prior art grain bin dryers, a region of low pressure would develop immediately downstream from the burner nozzle such that when the fuel burned in this area, it would burn with a "yellowish" color flame generally indicative of incomplete combustion.

To address the low pressure region, U.S. Pat. No. 5,400,525 disclosed a burner which includes a conical-shaped flame cone within the low pressure region of the flame diverter downstream from burner nozzle on the inside of the flame diverter. By placing the flame cone on the downstream side of the flame diverter in the region of normally low pressure, the combusting air/fuel mixture is diverted from this low pressure region and is at least partially confined between the inner faces of flame diverter and the outer face of the flame cone such that excess air forced through openings in diverter slats and excess air flowing around the slats is mixed with the combusting air/fuel mixture thereby to result in more complete combustion of the air/fuel mixture. As a result of the flame cone, substantially the entire quantity of the air/fuel mixture burns with a generally colorless or "blue" flame which is visually indicative of more complete combustion of the fuel. Of course, such combustion results in the maximum amount of heat being released from the fuel such that the efficiency of the burner is increased as indicated in the chart of FIG. 15 herein. In addition, as the air flowing through the housing encounters the flame diverter and flame cone, the air and the flames are intermixed and are forced to spread radially outwardly toward the housing walls. While this design increases the efficiency of the burner, the burner disclosed below provides even further increased efficiency.

Thus, there has been a long-standing problem as to how to maximize combustion to maximize efficiency of the heater and to simultaneously uniformly distribute the heated air with the air forcefully moved through the heater without duly restricting the flow of air through the blower/heater unit.

SUMMARY

Briefly stated, a heater assembly for a grain bin or similar device having an outer housing with an inlet end and an outlet end, the outer housing having one or more housing walls, a blower for forcefully moving air from the inlet end through the outer housing and out of the outlet end, a burner within the outer housing intermediate the inlet and outlet ends for burning a fuel within the outer housing and for heating the air moving through the housing. The burner includes a collector adapted to receive fuel from a fuel line; a burner housing attached to the collector to receive fuel; a nozzle attached to the burner housing to receive fuel, the nozzle having conduits extending from a surface of the nozzle, the conduit defining outlets for the fuel; a flame diverter within the outer housing downstream from the burner housing sized, shaped and adapted to divert the flame outwardly from the burner housing toward the walls of the outer housing, the flame diverter comprising a cone-shaped member diverging outwardly from the burner housing and toward the walls of the outer housing, the diverter defining a plurality of spaced openings through which air moved by the blower to may pass; and a flame cone having an apex and an outer base spaced axially from the apex with the slope of the flame cone being generally similar to the slope of the flame diverter, the apex of the flame cone being positioned near the nozzle on the inside of the flame diverter to define a gap between the inside face of the flame diverter and the outer surface of the flame cone; said gap defining a path for burning fuel to travel from the nozzle outwardly toward the outer housing wall, thereby to result in substantially complete combustion of the fuel.

The foregoing and other features and advantages of the disclosure as well as embodiments thereof will become more apparent from the reading of the following description in connection with the accompanying drawings.

DESCRIPTION OF THE DRAWINGS

In the accompanying drawings which form part of the specification:

FIG. 15 is a table illustrating test results of the prior art burner assembly;

FIG. 16 is a first table illustrating the test results of the burner assembly;

FIG. 17 is a second chart illustrating the test results of the new burner assembly; and FIG. 18 is a third chart illustrating the test results of the new burner assembly.

Corresponding reference numerals indicate corresponding parts throughout the several figures of the drawings.

DETAILED DESCRIPTION

Figure 1:
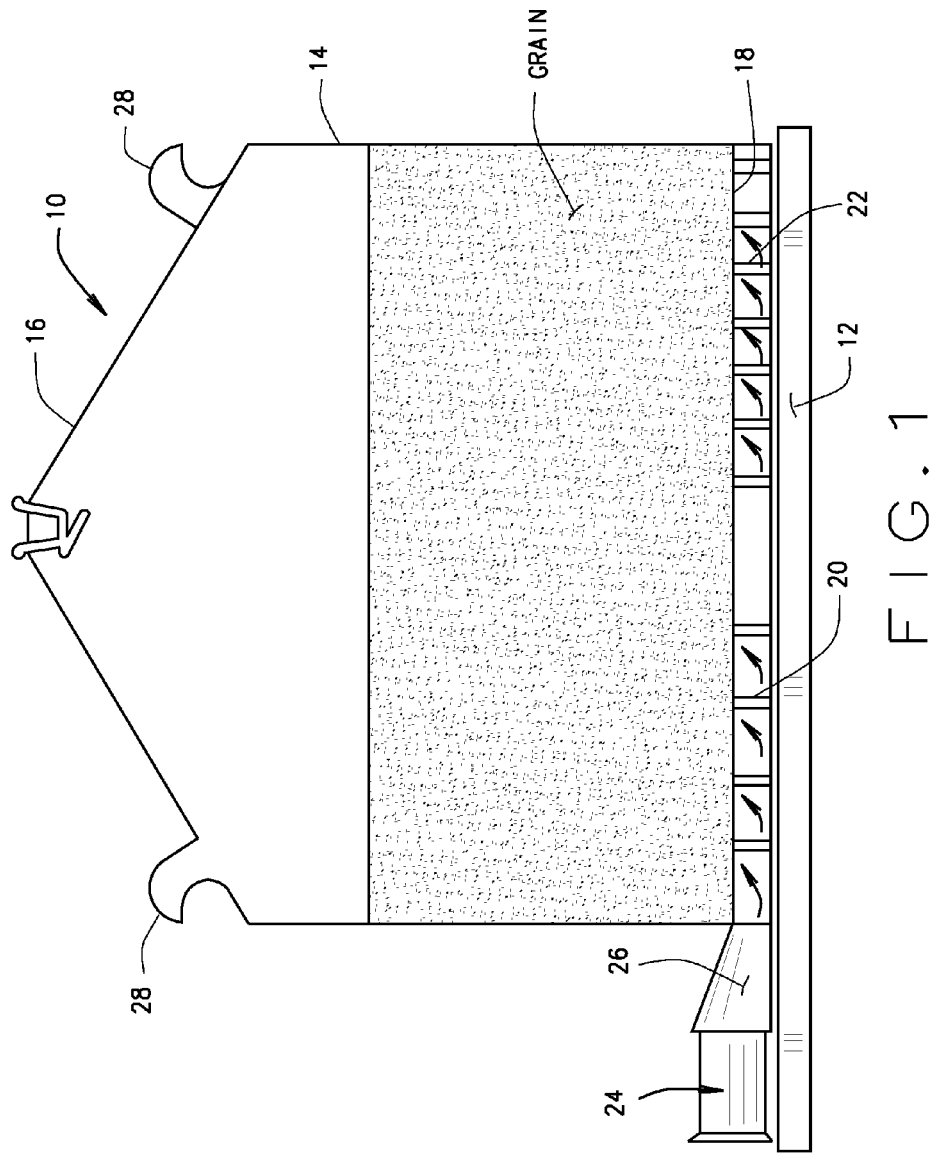
FIG. 1 is a cross-sectional view of a grain bin illustrating a raised perforated floor, a heater and fan arrangement for introducing heated air under pressure into a plenum beneath the grain bin floor so as to uniformly force heated air to rise through the grain within the bin supported by the raised floor.
Figure 2:
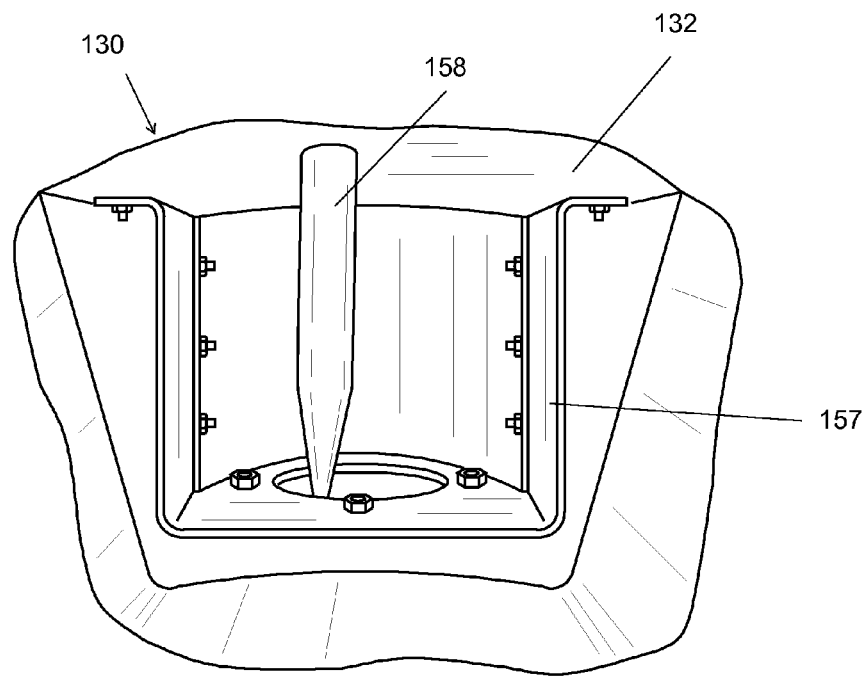
FIG. 2 is a perspective view of a collector of a prior art burner.
Figure 3:
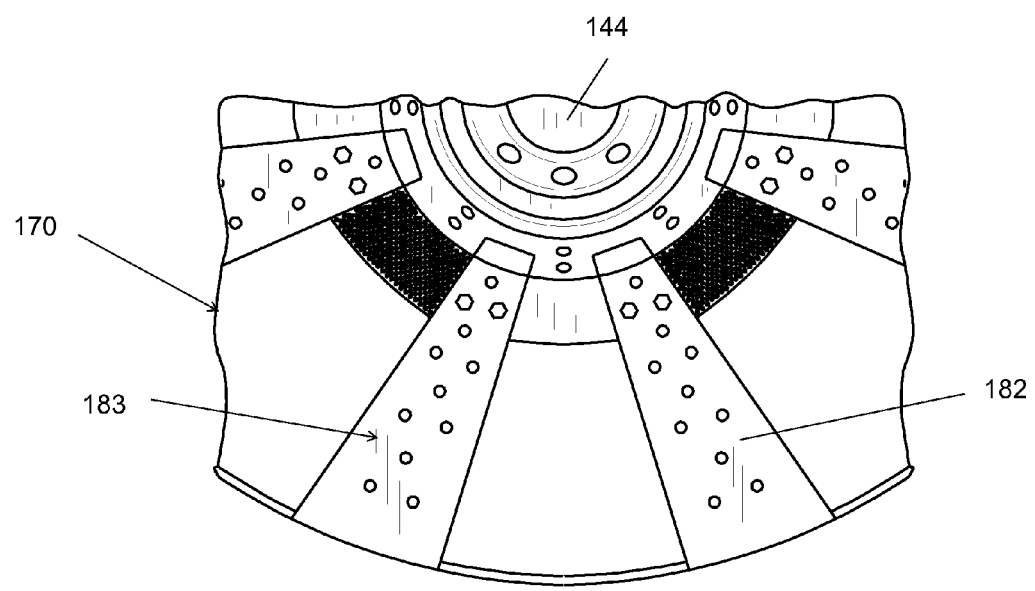
FIG. 3 is a front view of a flame diverter of the prior art burner.
Figure 4:
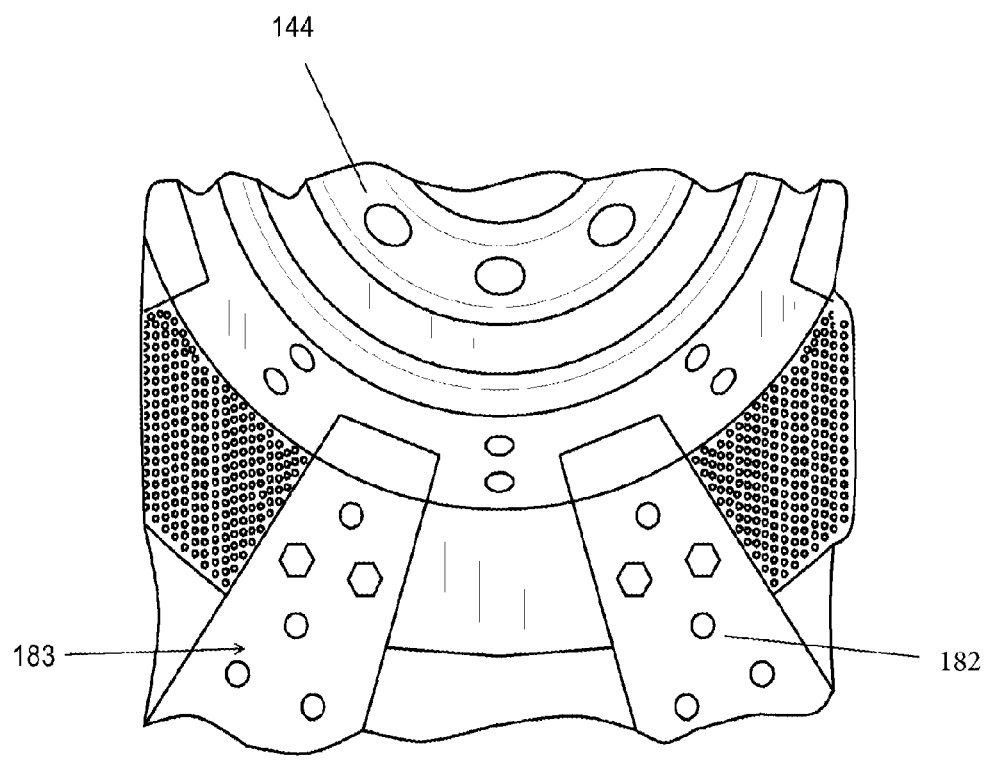
FIG. 4 is a enlarged front view of a flame diverter of the prior art burner.
Figure 5:
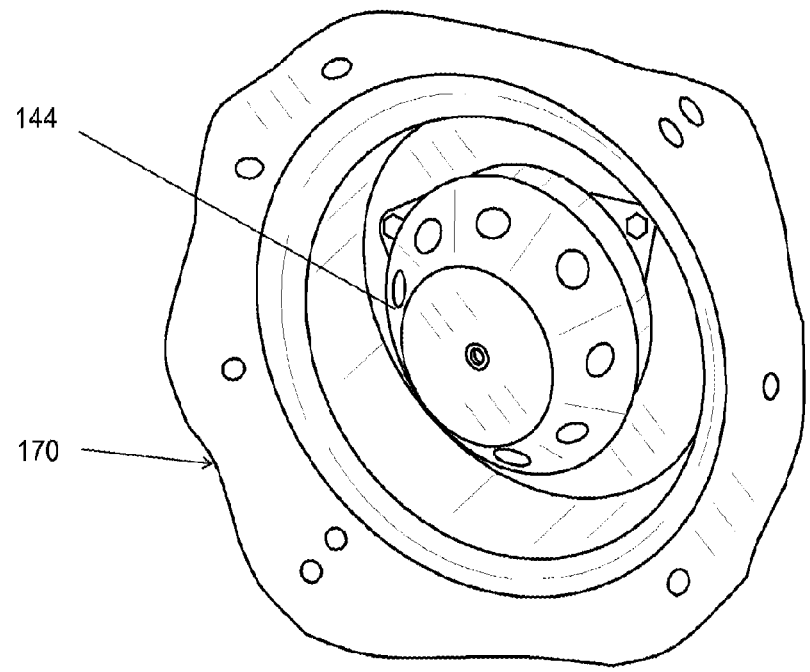
FIG. 5 is a perspective view of a nozzle of the prior art burner.

The following detailed description illustrates the heater by way of example and not by way of limitation. The description clearly enables one skilled in the art to make and use the heater, describes several embodiments, adaptations, variations, alternatives, and uses of the heater, including what is presently believed to be the best mode of carrying out the heater. Additionally, it is to be understood that the disclosure is not limited in its application to the details of construction and the arrangements of components set forth in the following description or illustrated in the drawings. The heater is capable of other embodiments and of being practiced or being carried out in various ways. Also, it is to be understood that the phraseology and terminology used herein is for the purpose of description and should not be regarded as limiting.

As shown in FIG. 1, a grain bin 10 is installed on a foundation, such as, a concrete pad 12, and is adapted to receive and store grain. The grain bin 10 includes sidewalls 14 extending upwardly from the pad 12 and a generally conical-shaped roof 16 adapted to seat on the sidewalls 14. A raised floor 18 of interlocking side-by-side channel floor members is provided with perforations, such as a multiplicity of aeration holes (not shown). Support legs 20 support the floor 18 above the level of pad 12 to define a plenum 22 between the floor 18 and the pad 12.

A combination blower/heater unit 24 supplies heated air under pressure via a transition section 26 to the plenum 22 in a substantially uniform distribution pattern through the plenum 22 and through the perforations in the floor members and through a quantity of grain within the bin supported by the floor 18 to dry the grain. To discharge moisture from within the grain bin 10, the roof 16 defines a plurality of roof vents 28 for venting air from within the grain bin 10 after the heated air passes through the grain.

Figure 6:
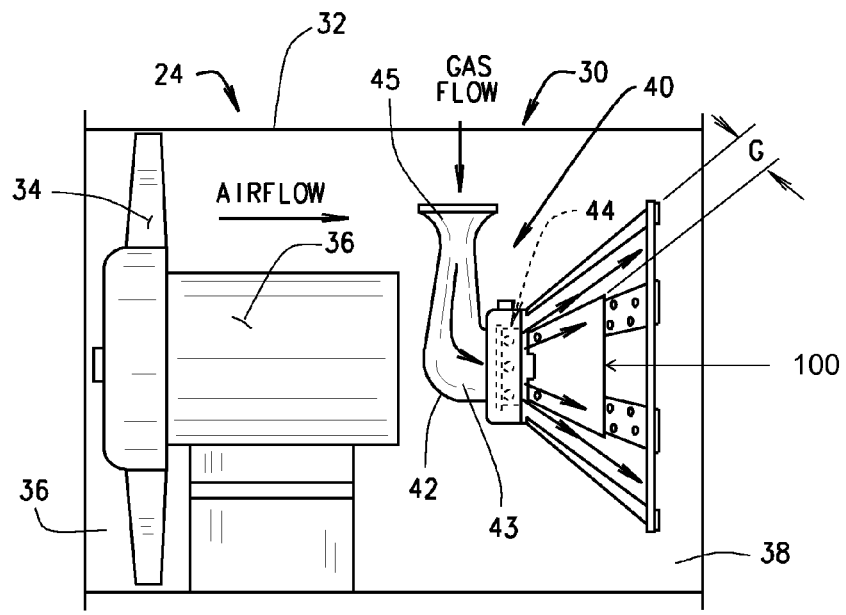
FIG. 6 is a side view of a heater and burner assembly of the prior art burner.
Figure 7:
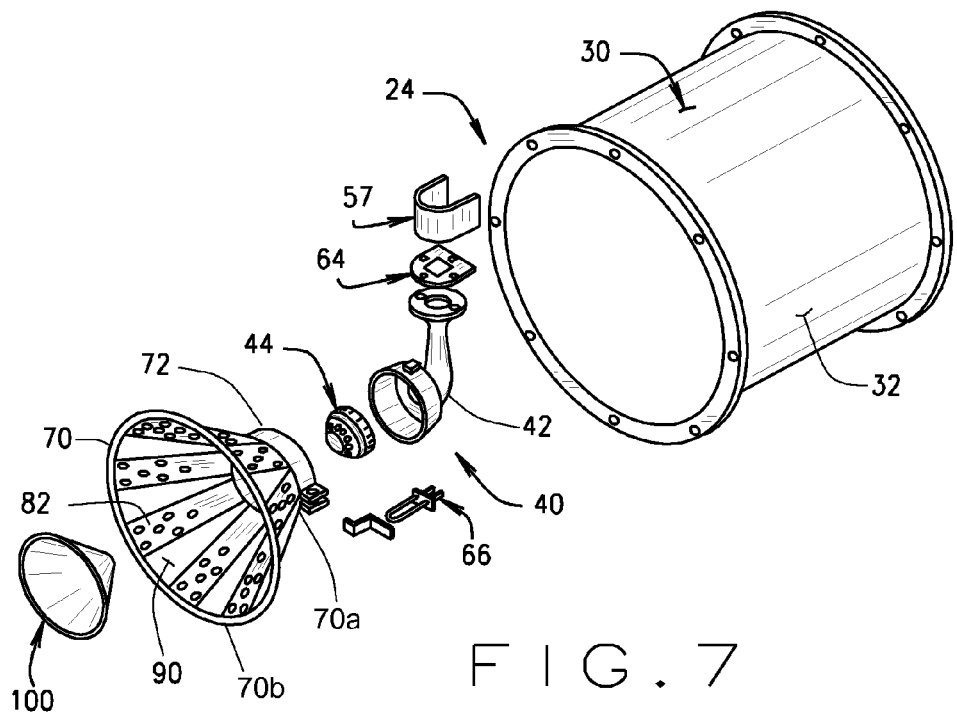
FIG. 7 is an exploded perspective view of the heater and burner assembly of the prior art burner.

As shown in FIGS. 6-7, the blower/heater 24 has an outer housing 30 having a generally cylindrical wall 32 adapted to enclose an axial fan 34. A motor 36, preferably electric (but which could be any type of motor), is operatively connected to the fan 34 to communicate air though the outer housing 30 from an inlet end 36 to an outlet end 38 and into the transition section 26 between outer housing 30 and grain bin sidewall 14 to introduce the heated air into the plenum 22. While the fan 34 is shown to be an axial fan, any suitable air moving device can be used, including, but not limited to a centrifugal blower.

The blower/heater 24 also includes a burner 40 located centrally within outer housing 30, preferably on the axial centerline of the outer housing 30, and downstream from the fan 34. More specifically, the burner 40 includes a right angle burner housing 42 with a first portion 43 positioned generally on the axial centerline of the housing, and a second portion 45 extending upwardly toward the outer housing wall 32.

Figure 10:
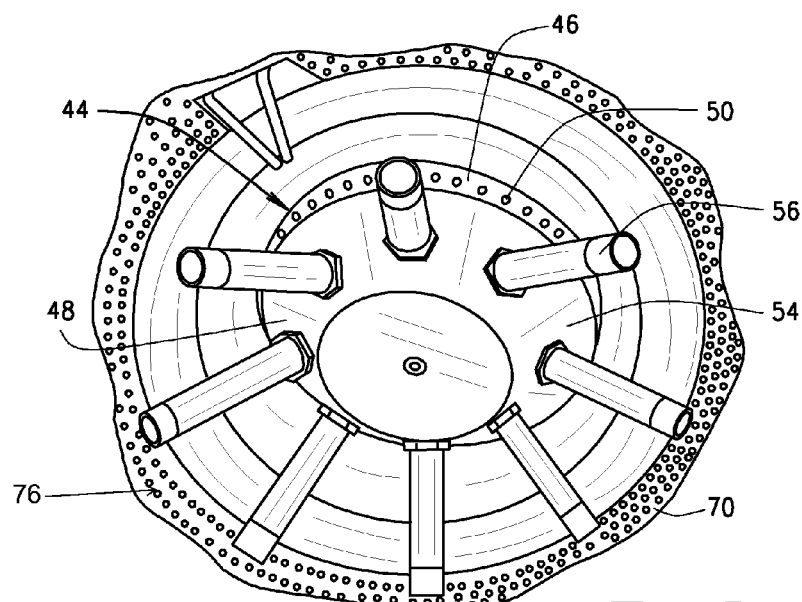
FIG. 10 is a perspective view of a nozzle of the burner assembly without a cone.

A nozzle 44 is attached to the end of the first portion 43 of the burner housing 42 with the nozzle 44 positioned generally on the axial centerline of outer housing 30. (FIG. 10) The nozzle 44 is a generally in the shape of a cylindrical cup that defines a generally cylindrical surface 46 (FIG. 10) with an angled surface 48 extending therefrom. The angled surface 48 is in the shape of a truncated cone. The cylindrical surface 46 defines a first set of holes 50, preferably thirty-six ⅜" evenly spaced holes, which are adapted, sized and shaped to deliver fuel from the burner housing 42 to a flame diverter 70. The angled surface 48 defines a second set of holes 54 adapted to receive respective elongate conduits or tubes 56 which extend from the angled surface to deliver fuel from the burner outer housing 30 to the flame diverter 70. Illustratively, each conduit 56 is a ⅜×3½" pipe extension, but any suitable conduit can be used.

A collector 57 (FIG. 8) is positioned between the second portion 45 (FIG. 6) of the burner housing 42 and the housing wall 32. The collector 57 is adapted to receive a fuel line/orifice 58 and to direct fuel into the burner housing 42. Preferably, the collector 57 includes a generally C-shaped bracket 60 attached to the inner surface of the outer housing 30, such as with fasteners or by welding. The bracket 60 defines an opening 62 adapted to mate with the burner housing 42. An arcuate plate 64 or scoop attaches generally about the bracket opening 62, such as with fasteners or by welding. The plate 64 extends upwardly towards the outer housing 30 at an angle, preferably of about 45°, and attaches to the sides of the bracket 60, such as with fasteners or by welding. The plate 64 defines an opening 65 adapted to receive and secure the fuel line 58 relative to the opening 62 in a position to center and dispense fuel into the burner housing 42.

Figure 8:
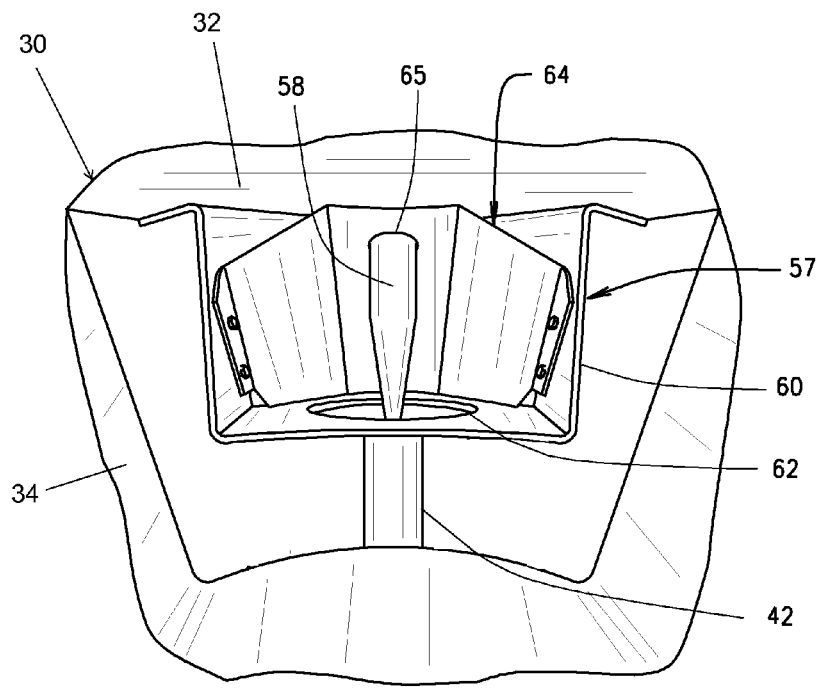
FIG. 8 is a perspective view of a collector assembly of the burner assembly.

The fuel line 58 extends through the housing wall 32 to supply a vaporized fuel, such as natural gas or liquefied propane (LP), to the burner 40. A liquid fuel vaporizer (not shown, but typically a coil of tubing carrying the liquid propane to the burner 40) is located centrally within outer housing 30 downstream from the burner 40 to be heated by the flame and heated air from the burner 40 to evaporate the liquid propane prior to discharging it into the air flowing through the burner housing 42. The collector 57 thus mixes the vaporized fuel with air prior to ignition of the resulting air/fuel mixture outside the burner 40. As shown in FIG. 8, the vaporized fuel from the fuel line 58 is directed downwardly to the burner housing 42 behind the collector 57 and collector plate 64 and into the second portion 45 of burner housing 42. The vaporized fuel is mixed with combustion air as it encounters the collector 57 and collector plate 64 such that an air/fuel mixture is drawn through the burner housing 42 and vented through the holes 50 and conduits 56 provided in nozzle 44. An igniter or spark plug 66 (FIG. 7) positioned downstream from the nozzle 44 ignites the air/fuel mixture discharged from the burner 40 at a location generally centered within outer housing 30.

Figure 9:
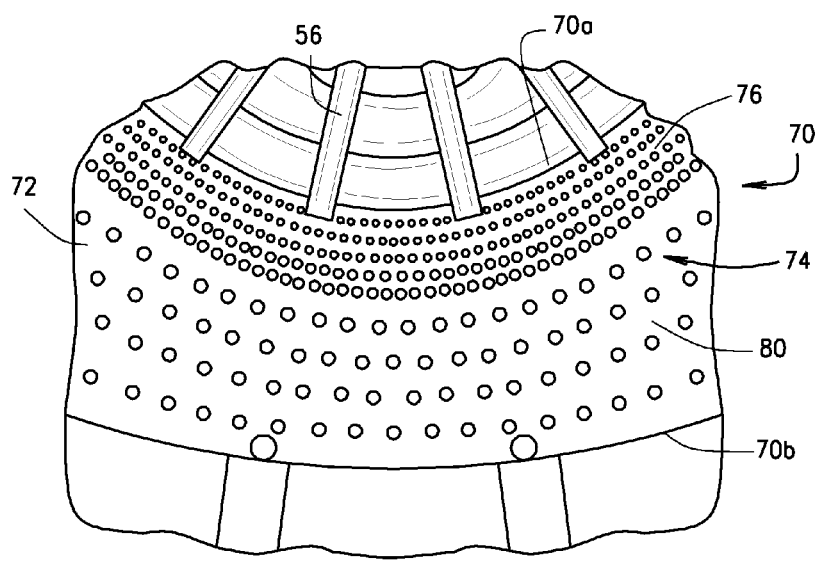
FIG. 9 is a enlarged front view of a flame diverter of the burner assembly.

A generally conical-shaped flame diverter 70 attaches to the downstream side of the burner 40. The flame diverter 70 includes a collar member 72 having an inner edge 70a near the burner and an outer edge 70b. The flame diverter 70 defines a plurality of holes 74 (FIG. 9) for admitting air to help insure that the combusting air/fuel mixture emitted from nozzle 44 has excess air for encouraging complete combustion of the fuel. Preferably, the plurality of holes 74 includes a first pattern of holes 76 near the edge 70a and forming, illustratively, five concentric rings with each ring defining evenly spaced and equally sized holes. The hole sizes of each ring increase with increasing distance from the edge 70a. A second pattern of holes 80 is positioned outside the circumference of the first pattern of holes 76. The second pattern of holes 80 defines symmetrically spaced and equally sized holes. Those skilled in the art will recognize that any pattern of holes can be used.

Figure 11:
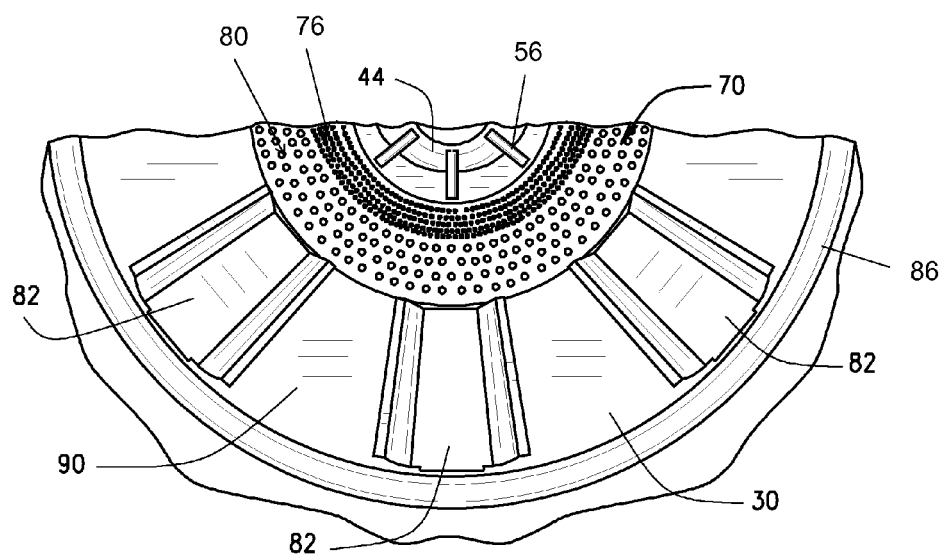
FIG. 11 is a perspective view of slats around the nozzle without a cone.
Figure 12:
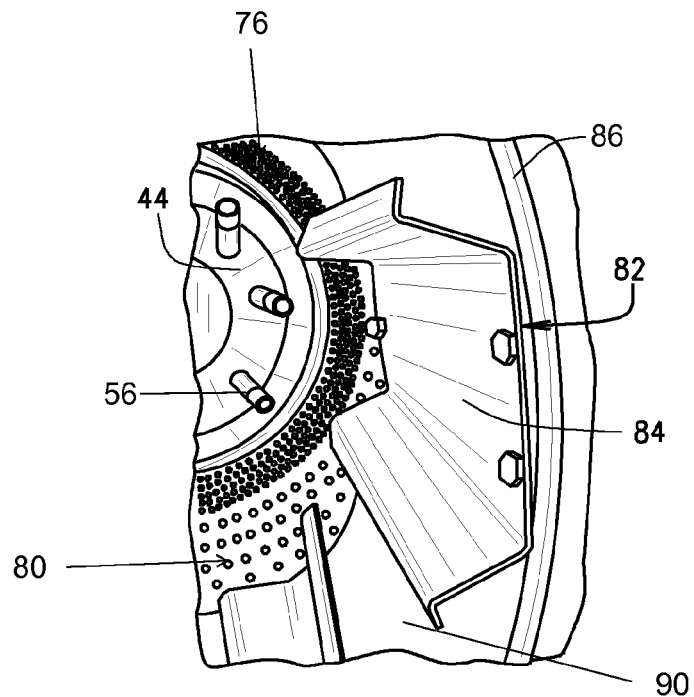
FIG. 12 is an end view of the slat without a cone.
Figure 13:
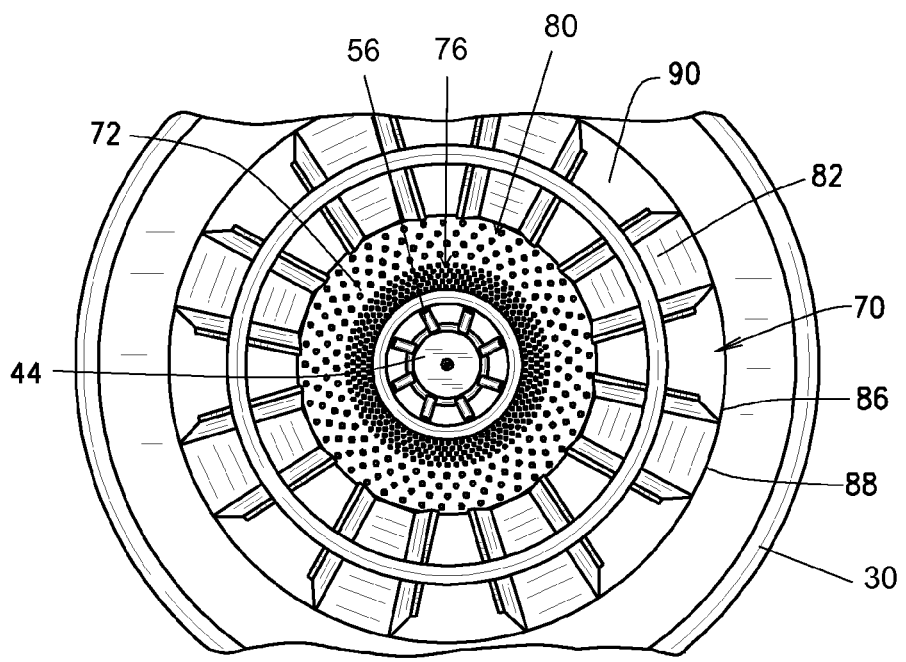
FIG. 13 is a perspective view of the burner assembly with a cone.
Figure 14:
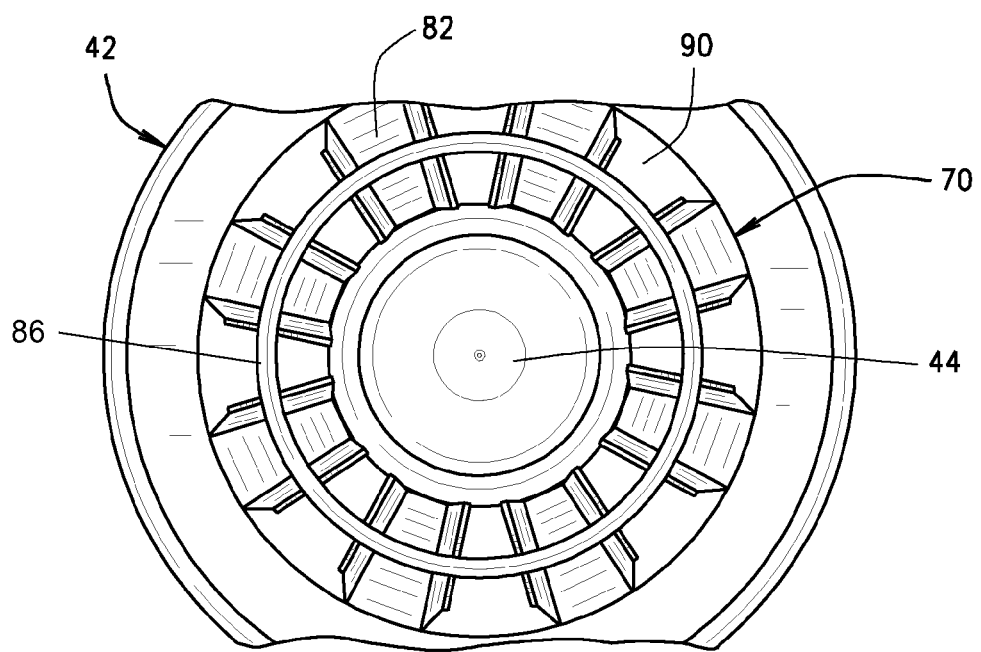
FIG. 14 is a perspective view of a burner assembly without a cone.

The flame diverter 70 further includes a plurality of radially spaced slats 82 (FIGS. 11-13) near and generally aligned with the nozzle conduits 56 which diverge radially outwardly and angle downstream from the collar member 72 to divert the flame formed at the burner nozzle 44 outwardly toward the wall 32 of outer housing 30. Each slat 82 has a generally trapezoidal-shaped channel 84 (FIG. 12) that extends the length of the slat 82. However, other channels shapes can be used, including but not limited to square, arcuate, rectangular, and the like. In addition, the width of the channel can vary along its length. There are no holes in the slats 82, thereby, allowing the fuel to burn longer before entering the air flow. The outer ends of the slats 82 attach to an annular bracket or ring 86. The slats 82 are spaced apart from each other to define a plurality of openings 90 between them through which the air moving through burner housing 42 must pass. During operation, the fan 34 moves air through the burner housing 42. Fuel is emitted from the nozzle 44 and is ignited within the burner housing 42 to heat the air.

While the flame diverter 70 has been described as comprising a collar member 72 and plurality of spaced slats 82 with spaced openings 90 between the slats, it will be understood that flame diverters of other configurations may be used. For example, a flame diverter (not herein illustrated) may be a conical-shaped structure of sheet metal construction or the like having a plurality of air passage openings therein with the air passage openings being of sufficient cross-sectional area to permit air forcefully moved by fan 34 to pass through outer housing 30 without undue restriction. In addition, smaller combustion air holes, such as holes in slats, may be provided.

A flame cone 100 is installed within the flame diverter 70 downstream from burner nozzle 44 on the inside of the conical-shaped flame diverter 70. (FIGS. 6-7) More particularly, the flame cone 100 is preferably a cone-shaped member having a slope or conical angle generally the same as the slope of the conical-shaped flame diverter 70. The end portion of the flame cone 100 is preferably positioned as close as possible to (even abutting) burner nozzle 44 such that a gap G (FIG. 6), ranging between about 1 inch (about 2.54 cm) and about 6 inches (about 15.25 cm), and more preferably ranging between about 1½ inches (about 3.8 cm) to about 3½ inches (about 8.9 cm), is formed between the inside face of the flame diverter 70 and the outer face of the flame cone 100.

In operation, the fuel line 58 delivers vaporized fuel to the burner housing 42 behind the collector 57 and collector plate 64 and into the second portion of blower/heater outer housing 30. The vaporized fuel is mixed with combustion air as it encounters the collector 57 and collector plate 64 such that an air/fuel mixture is drawn through the blower/heater outer housing 30 with fan 34 forcefully moving air through outer housing 30 from its inlet end 36 past the burner 40 to its outlet end 38, so that an air/fuel mixture emits from the holes 50 and conduit 56 of the nozzle 44 into the gap G between the inner face of flame diverter 70 and the outer face of the flame cone 100 where the air/fuel mixture is ignited by igniter 66. The resulting combusting air/fuel mixture is forced by the air moving through the housing and by being forcefully ejected from the flame holes of the burner nozzle 44 to move in a divergent fashion radially outwardly and downstream within the gap G formed between the inner faces of flame diverter slats 82 and the outer face of flame cone 100. By placing the flame cone 100 on the downstream side of the flame diverter 70 in the region of normally low pressure, the combusting air/fuel mixture is diverted from this low pressure region and is at least partially confined between the inner faces of the flame diverter 70 and the outer face of the flame cone 100 such that excess air flowing around the slats 82 is mixed with the combusting air/fuel mixture thereby resulting in substantially complete combustion of the air/fuel mixture. As a result of the flame cone 100, substantially the entire quantity of the air/fuel mixture burns with a colorless or "blue" flame, which is visually indicative of complete (or near complete) combustion of the fuel. Of course, such substantially complete combustion maximizes the amount of heat released from the fuel such that the efficiency of the burner 40 is maximized and such that the maximum volume of air is heated the greatest amount. In addition, as the air flowing through blower/heater outer housing 30 encounters the flame diverter 70 and flame cone 100, the air and the flames are intermixed and are forced to spread radially outwardly toward the housing walls 32.

The diameter of the downstream end (i.e., the enlarged end) of flame cone 100 is such that the flame cone 100 does not unduly restrict or interfere with the flow of air through the housing. The flame cone 100 is installed in the outer housing 30 at the center thereof in close proximity to burner nozzle 44, and in axial alignment with motor 36 such that the motor and the nozzle 44 serve to at least partially block the flow of air in the center portion of the blower/heater outer housing 30 which may in part result in the above-noted low pressure area. As the air moves past the downstream end of flame cone 100, the air is caused to mix turbulently with the products of combustion of the fuel, to thereby more uniformly mix the heated air with the airstream moving though the housing. This results in the entire airstream exhausted from outer housing 30 being uniformly heated to a higher temperature and thus eliminates wide variations in temperature in the heated air. As shown by the exemplary charts of FIGS. 15-18, a larger volume of air heated uniformly to a higher temperature is available for discharge into the grain bin per unit volume of fuel consumed than when the burner is not used.

Changes can be made in the above constructions without departing from the scope of the disclosure, it is intended that all matter contained in the above description or shown in the accompanying drawings shall be interpreted as illustrative and not in a limiting sense.

What is claimed is:

1. A heater assembly comprising an outer housing having an inlet end and an outlet end, the outer housing having one or more housing walls, a blower for forcefully moving air from the inlet end through the outer housing and out of the outlet end, a burner within the outer housing intermediate the inlet and outlet ends for burning a fuel within the outer housing and for heating the air moving through the housing, the burner comprising:
    a collector adapted to receive fuel from a fuel line;
    a burner housing attached to the collector to receive fuel;
    a nozzle attached to the burner housing to receive fuel, the nozzle comprising a member having a surface with a plurality of holes defined therein, said nozzle further having a plurality of elongate conduits extending from the surface of the nozzle, each of said plurality of conduits in fluidic communication with one of said plurality holes in the surface, the conduit defining outlets for the fuel;
    a flame diverter within the outer housing downstream from the nozzle sized, shaped and adapted to divert the flame outwardly from the nozzle toward the walls of the outer housing, the flame diverter comprising a cone-shaped member diverging outwardly from the nozzle and toward the walls of the outer housing, the diverter defining a plurality of spaced openings through which air moved by the blower may pass; and
    a flame cone having an apex and an outer base spaced axially from the apex with the slope of the flame cone being generally similar to the slope of the flame diverter, the apex of the flame cone being positioned near the nozzle on the inside of the flame diverter to define a gap between the inside face of the flame diverter and the outer surface of the flame cone; said gap defining a path for burning fuel to travel from the nozzle outwardly toward the outer housing wall, thereby to result in substantially complete combustion of the fuel.

2. The heater assembly of claim 1, wherein the collector comprises:
    a generally C-shaped bracket attached to the outer housing, the bracket defining an opening adapted to mate with the burner housing; and
    a generally arcuate plate attached generally about the opening of the bracket and positioned at an angle relative to the bracket, the plate defining a hole adapted to receive and secure the fuel line in a position to dispense fuel into the burner housing.

3. The heater assembly of claim 1, wherein the surface of the member of the nozzle:
    has a generally cylindrical surface and a generally angled surface extending from the cylindrical surface, the cylindrical surface defining a second plurality of holes through which fuel can exit the nozzle; and
    said conduits extend from the angled surface, said conduits defining fuel exits from said nozzle.

4. The heater assembly of claim 1, wherein the flame diverter, comprises:
    a ring member having an inner edge positioned adjacent the nozzle and an outer edge, the ring member defining a plurality of holes adapted to permit air moved by the blower to pass therethrough; and
    a plurality of slats diverging outwardly from the ring member.

5. The heater assembly of claim 4, wherein the plurality of slats are generally equidistantly spaced in a radial configuration.

6. The heater assembly of claim 4, wherein a width of each slat generally varies along the length of the slat.

7. The heater assembly of claim 4, wherein each slat defines a generally trapezoidal-shaped channel that extends generally the length of the slat.

8. The heater assembly of claim 4, wherein the plurality of slats are generally positioned in alignment with respective conduits.

9. A burner assembly for burning a fuel and for heating air moving through the burner assembly, the burner assembly comprising:
    a collector adapted to receive fuel from a fuel line;
    a burner housing attached to the collector to be in communication with the fuel line to receive fuel from the fuel line;
    a nozzle attached to the burner housing to receive fuel, the nozzle comprising a member having a surface with a plurality of holes defined therein, said nozzle further having a plurality of elongate conduits extending from the surface of the nozzle, each of said plurality of conduits in fluidic communication with one of said plurality holes in the surface and defining exits for fuel from the nozzle;
    a flame diverter downstream from the nozzle for diverting the flame outwardly from the nozzle, the flame diverter comprising a cone-shaped structure diverging outwardly from the nozzle, the flame diverter having a plurality of spaced openings through which air can pass, wherein the flame diverter comprises an inner edge positioned adjacent the nozzle and an outer edge, and a plurality of slats diverging outwardly toward the outer edge, wherein each slat defines a generally trapezoidal-shaped channel that extends generally the length of the slat and wherein each of the plurality of slats is generally positioned in alignment with a respective one of said plurality of conduits; and a flame cone having an apex and an outer base spaced axially from the apex with the slope of the flame cone being generally similar to the slope of the flame diverter, the apex of the flame cone being positioned near the nozzle on the inside of the flame diverter so that there is a gap between the inside face of the flame diverter and the outer surface of the flame cone so as to provide a path for the burning fuel to travel outwardly from the nozzle thereby to result in substantially complete combustion of the fuel.

10. The burner assembly of claim 9, wherein the collector comprises:

a generally C-shaped bracket defining an opening adapted to mate with the burner housing; and an generally arcuate plate attached generally about the opening of the bracket and positioned at an angle relative to the bracket, the plate defining a hole adapted to receive and secure the fuel line in a position to dispense fuel into the burner housing.

11. The burner assembly of claim 9, wherein the member of the nozzle:

is a generally cylindrical member having a generally annular outer surface and a generally angled surface, the outer surface defining a plurality of holes adapted to emit fuel and wherein said conduits extend from the angled surface to emit fuel.

12. The heater assembly of claim 9, wherein the flame diverter comprises:

a unitary ring member having said inner edge and an outer edge, the ring member defining a plurality of holes through which air moved by the blower can pass.

13. The heater assembly of claim 12, wherein the plurality of slats are generally equidistantly spaced in a radial configuration.

14. The heater assembly of claim 12, wherein a width of each slat generally varies along the length of the slat.

* * * * *